United States Patent
Thubert et al.

(10) Patent No.: US 7,729,328 B2
(45) Date of Patent: Jun. 1, 2010

(54) REAL-TIME SESSIONS FOR WIRELESS MESH NETWORKS

(75) Inventors: Pascal Thubert, La Colle sur Loup (FR); Patrick Wetterwald, Mouans Sartoux (FR); Vincent Ribiere, Biot (FR); Robert J. Friday, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 301 days.

(21) Appl. No.: 11/686,105

(22) Filed: Mar. 14, 2007

(65) Prior Publication Data

US 2008/0225804 A1   Sep. 18, 2008

(51) Int. Cl.
  H04W 4/00    (2009.01)
  H04L 12/28   (2006.01)
  H04J 3/00    (2006.01)
  H04L 12/54   (2006.01)

(52) U.S. Cl. ................. 370/338; 370/394; 370/476; 370/412; 370/428

(58) Field of Classification Search ............. 370/260, 370/392, 338, 394, 476, 474, 412, 428–429
See application file for complete search history.

(56) References Cited

U.S. PATENT DOCUMENTS

| | | | | |
|---|---|---|---|---|
| 5,764,625 | A * | 6/1998 | Bournas | 370/231 |
| 6,167,060 | A * | 12/2000 | Vargo et al. | 370/468 |
| 6,728,924 | B1 * | 4/2004 | Lou et al. | 714/776 |
| 7,002,993 | B1 * | 2/2006 | Mohaban et al. | 370/471 |
| 7,035,295 | B2 * | 4/2006 | Belleguie | 370/537 |
| 7,136,377 | B1 * | 11/2006 | Tweedly et al. | 370/356 |
| 7,240,175 | B1 * | 7/2007 | Maitland et al. | 711/167 |
| 7,266,106 | B2 * | 9/2007 | Nylander et al. | 370/338 |
| 7,295,575 | B2 * | 11/2007 | Ido et al. | 370/474 |
| 7,356,021 | B2 * | 4/2008 | Mundra et al. | 370/229 |
| 7,486,673 | B2 * | 2/2009 | Harijono et al. | 370/389 |
| 2002/0031125 | A1 * | 3/2002 | Sato | 370/394 |
| 2005/0105557 | A1 * | 5/2005 | Yamane et al. | 370/474 |
| 2007/0037602 | A1 * | 2/2007 | Shimizu et al. | 455/550.1 |

FOREIGN PATENT DOCUMENTS

| | | |
|---|---|---|
| EP | 1 443 733 A2 | 8/2004 |
| EP | 1 492 285 A1 | 12/2004 |

OTHER PUBLICATIONS

PCT/US2008/055838, International Search Report, European Patent Office, Oct. 15, 2008.

(Continued)

*Primary Examiner*—Steven H Nguyen
*Assistant Examiner*—Candal Elpenord
(74) *Attorney, Agent, or Firm*—Baker Botts L.L.P.

(57) ABSTRACT

A real-time data transport protocol directed to aggregating multiple packets of a real-time protocol session and transmitting redundant copies of the packets as defined by a sliding window. In particular implementations, a method comprising accessing a plurality of packets of a real-time protocol session; aggregating, over a sliding window, a contiguous sequence of packets in the plurality of packets into real-time data transport packets, and transmitting the real-time data transport packets to a receiving node.

18 Claims, 8 Drawing Sheets

OTHER PUBLICATIONS

Perkins, Colin, et al., "A Survey of Packet-Loss Recovery Techniques for Streaming Audio", Department of Computer Science, University College Londgon, Aug. 10, 1998.

Lee, W.S., et al. "A Robust Codec for Transmission of Very Low Bit-Rate Video over Channels with Bursty Errors", International Conference on Image Processing, Santa Barbara, Oct. 26-29, 1997.

* cited by examiner

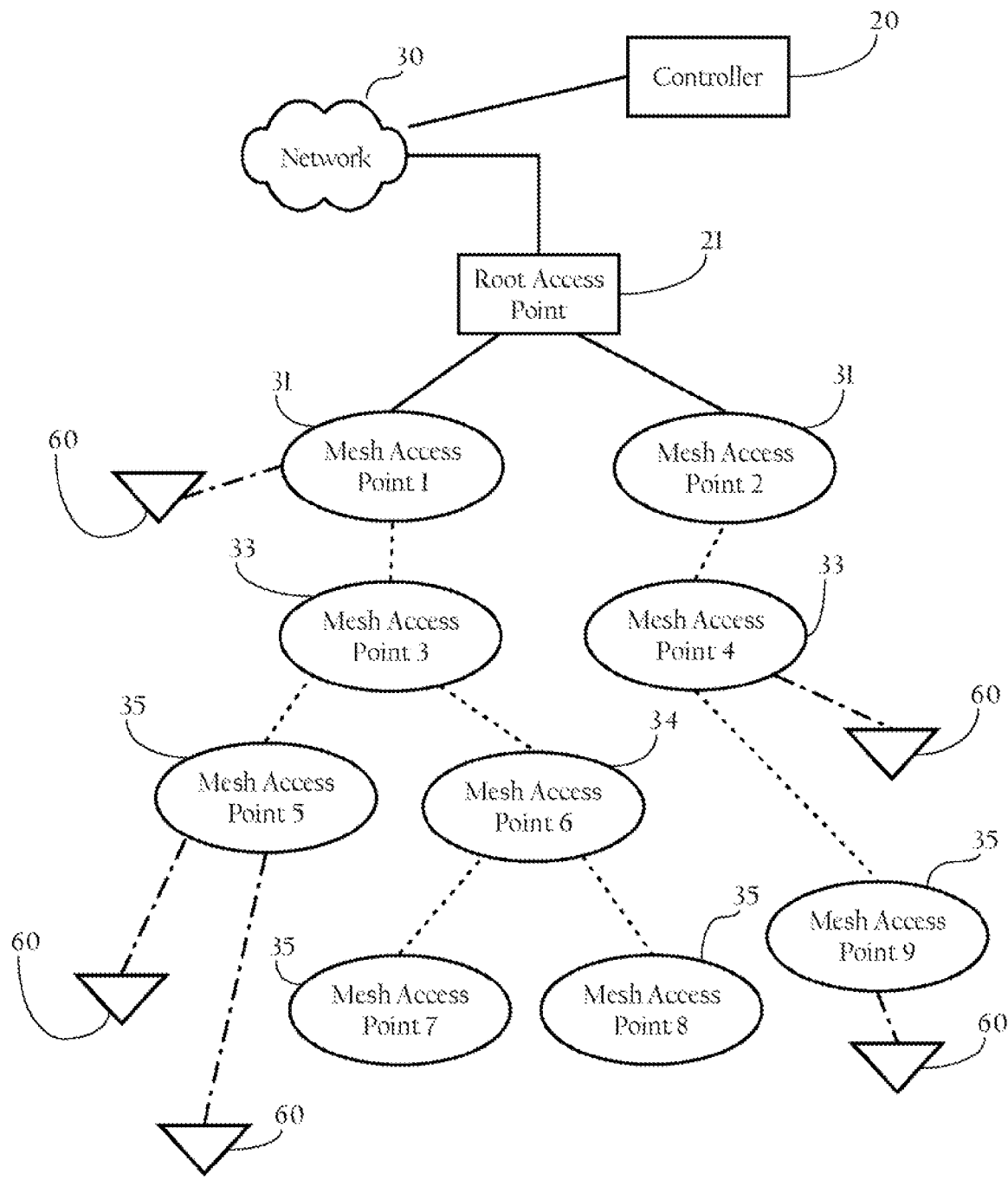
Fig._1

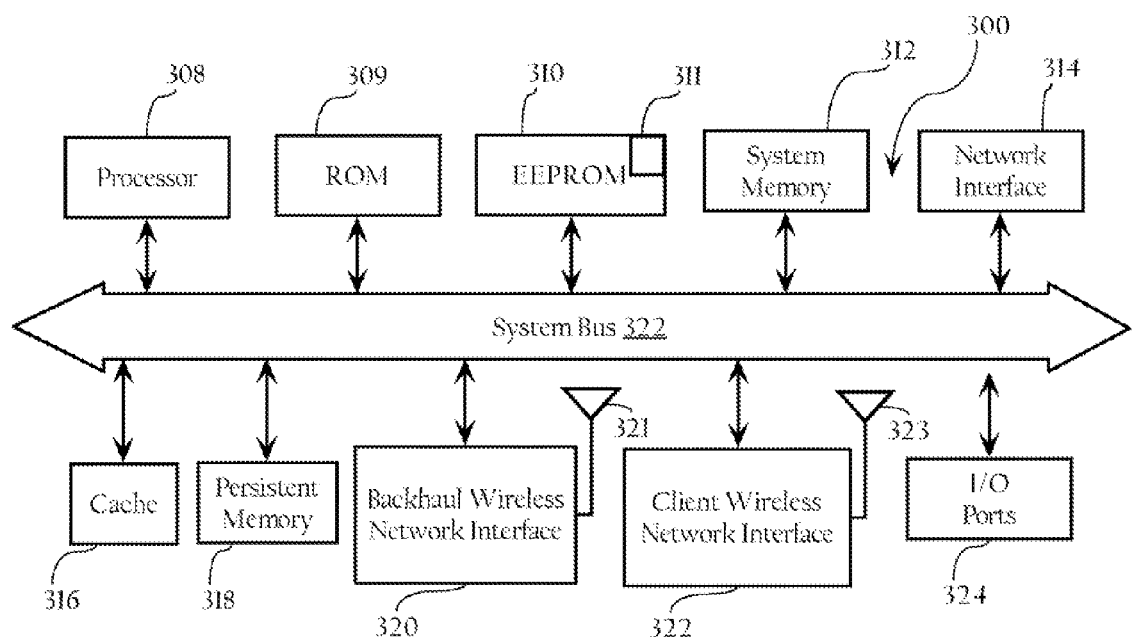
Fig._3A
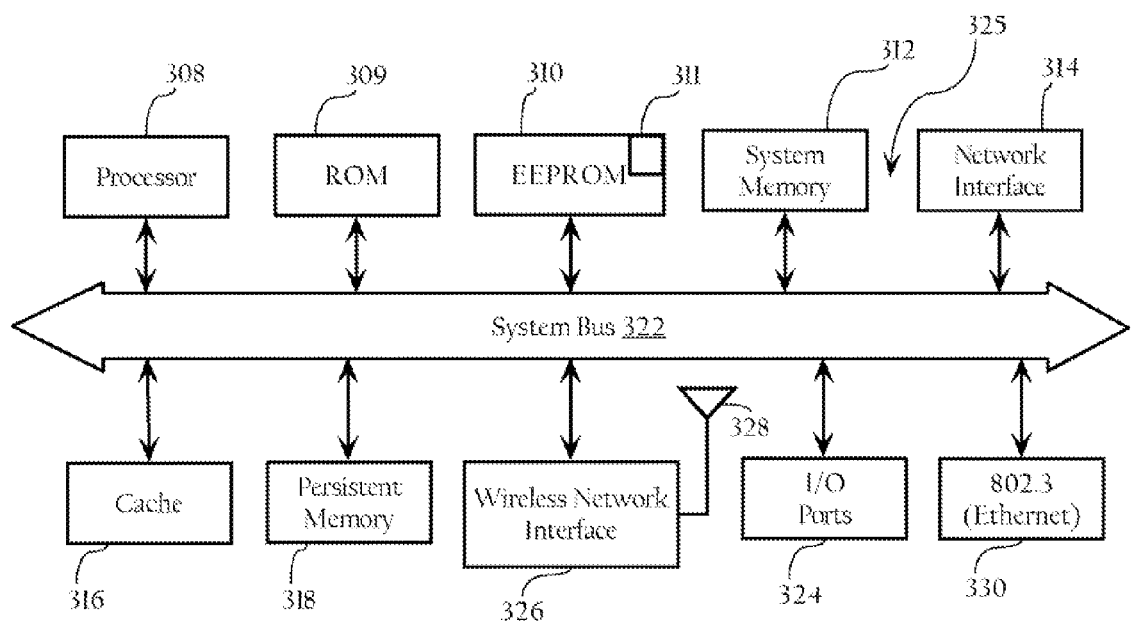
Fig._3B

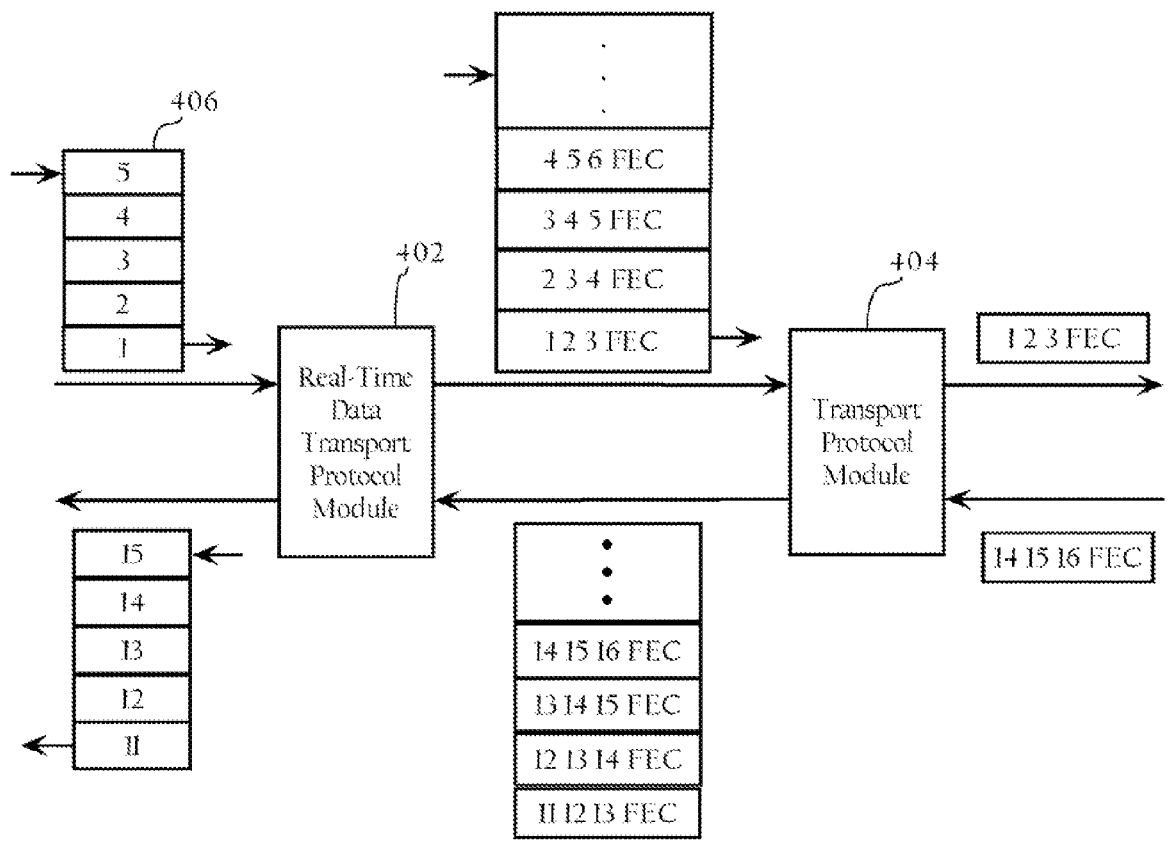
Fig._4

Fig._6

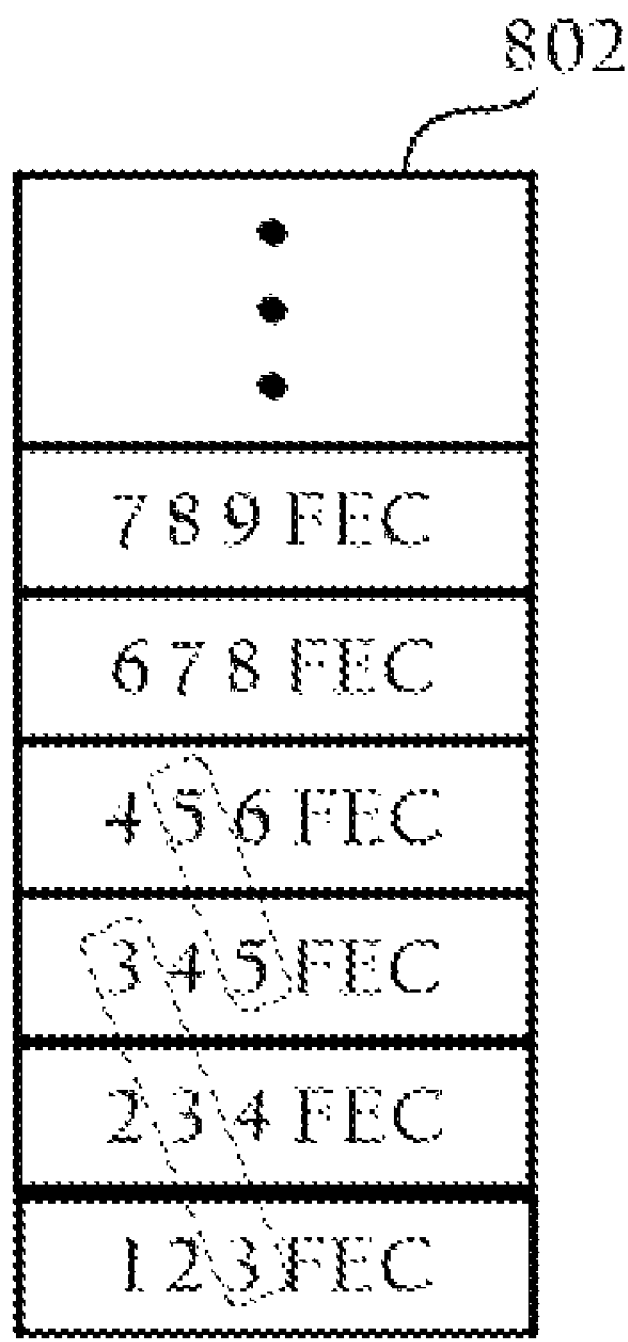
Fig._8

REAL-TIME SESSIONS FOR WIRELESS MESH NETWORKS

TECHNICAL FIELD

This disclosure relates generally to wireless mesh networks and real time protocol streams, such as voice or video data streams.

BACKGROUND

Market adoption of wireless LAN (WLAN) technology has exploded, as users from a wide range of background and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Voice codecs usually operate with a loss rate up to 10-15 percent, which in wireless networks may only be guaranteed with a very good signal (e.g., −65 dbm) and low interference. Such conditions are typically not met in wireless mesh network, where the error rate may be as high as 25%, which is why some claim that many wireless mesh networks do not adequately support voice sessions. A problem is that codecs are tuned for relatively reliable networks (e.g., wired networks) and are optimized for small packets as opposed to redundancy and latency. In particular, codecs may have difficulties adapting to sequential multiple packet loss. On the other hand, a radio network is not as reliable as wired networks. In addition, wireless mesh networking has a multiplying effect since it relies on multiple radio hops using multiple radio technologies.

A radio mesh network can be tuned to retry packets many times at each hop. However, a retry has a good chance of meeting the same interference as the original packet for some amount of time. Also, each retry costs as much as sending a new packet over a given hop, causing congestion at portions of the mesh network that operate at the same frequency. As a result, those retries add latency to both the original packet and all other packets in the mesh network, and degrade the mesh network capacity at the expense of other voice sessions.

DESCRIPTION OF THE DRAWINGS

FIG. 1 illustrates an example topological diagram of a hierarchical wireless mesh network.

FIG. 3A illustrates for didactic purposes a hardware system 300, which may be used to implement a mesh access point.

FIG. 3B illustrates for didactic purposes a hardware system 325, which may be used to implement a mesh access point in accordance with another implementation.

FIG. 4 illustrates an example flow diagram involving a real-time data transport protocol according to one implementation of the invention.

FIG. 8 shows a receive queue containing voice transport protocol packets.

DESCRIPTION OF EXAMPLE EMBODIMENTS

A. Overview

Figure 2A:
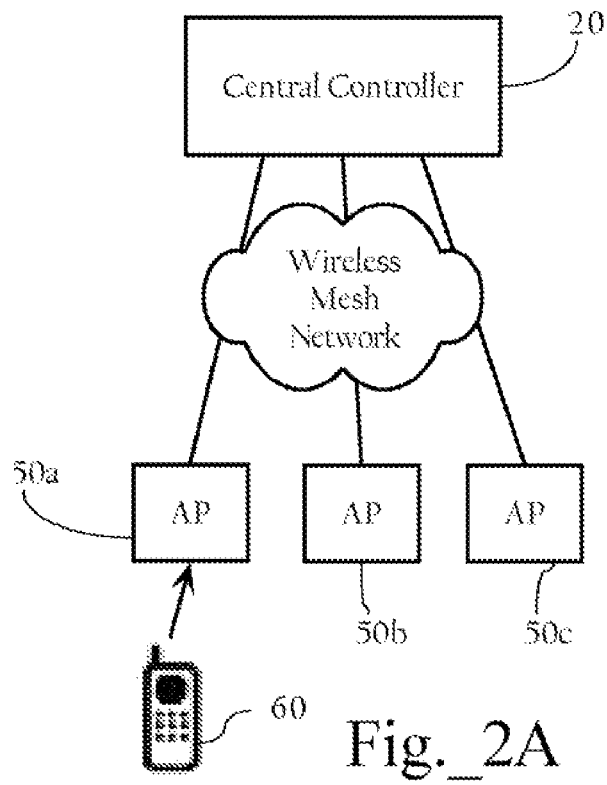
FIG. 2A illustrates a schematic, logical view of the hierarchical relationship between mesh access points and a central controller.

Particular implementations facilitate the delivery of real time protocol session data, such as voice and video, over wireless mesh networks. As described in more detail below, a mesh access point, or any other appropriate wireless network infrastructure node (e.g., a controller), implements a real-time data transport protocol directed to aggregating multiple packets of a real-time protocol session and transmitting redundant copies of the packets as defined by a sliding window. Such real-time session packets may include video, audio, and other streaming media traffic. As described in more detail below, according to one implementation, a mesh access point generates real-time data transport protocol packets based on an aggregation of individual, contiguous real-time session packets defined by a sliding window, and then transmits the real-time data transport protocol packets to a destination node (e.g., another mesh access point, central controller, etc.). The sliding window advances packet-by-packet thereby providing a real-time data protocol stream including redundant real-time session packets. The recipient node recovers the real-time session packets by selecting one of the redundant real-time session packets, forwarding the selected packets to the destination host. This improves the reliability of the mesh network, because if a particular real-time data transport protocol packet is dropped, a given real-time session packet may still be received in a subsequent real-time data transport protocol packet.

On route to a destination node, the real-time data transport protocol packet typically may pass through one or more intermediate mesh access points. In some implementations, each intermediate mesh access point executes an intermediate real-time data transport protocol when forwarding packets. In some particular implementations, the mesh access point, as part of a physical and link layer functionality, may perform one or more error checking and correction operations on received wireless frames. Typically, a received wireless frames with unrecoverable errors are dropped. In one implementation, this behavior is modified for received frames containing real-time data transport protocol packets. That is, for most types of packets (e.g., non-voice packets), the mesh access point passes packets without errors up the protocol stack and drops packs with errors. For other types of packets (e.g., real-time data transport protocol packets), the mesh access point passes voice packets to higher levels of the protocol stack even with errors.

B. Example Wireless Mesh Network System Architecture

B.1. Network Topology

FIG. 1 illustrates a wireless mesh network according to one implementation of the present invention. In one implementation, the wireless mesh network includes a wireless mesh controller 20, a root access point 21, and a plurality of child wireless mesh access points. In one implementation, the mesh access points are logically arranged in a hierarchy for purposes of routing traffic to the root access point (RAP), and on to a network. In one implementation, this hierarchy can be dynamically configured and shifted based on discovery of wireless management messages between wireless mesh access points, or statically configured.

In one implementation, a hierarchical architectural overlay is imposed on the mesh network of routing nodes to create a downstream direction towards leaf routing nodes 35, and an upstream direction toward the root access point 21. For example, in the hierarchical mesh network illustrated in FIG. 1, first hop mesh access point 31 is the parent of intermediate mesh access point 33. In addition, intermediate mesh access points 33 and 34 are the parent to leaf mesh access point 35. In one implementation, this hierarchical relationship is used in routing packets between wireless clients 60, or between wireless clients 60 and network 30. Of course, a variety of wireless mesh network configurations are possible, including non-hierarchical configurations, and hierarchical configurations with fewer or greater number of hierarchical tree structures.

The mesh access points in the mesh network, in one implementation, generally include one radio, operating in a first frequency band, and associated wireless communication functionally to communicate with other mesh access points to thereby implement the wireless backbone, as discussed more fully below. All or a subset of the mesh access points, in one implementation, also include an additional radio, operating in a second, non-interfering frequency band, and other wireless communication functionally to establish and maintain wireless connections with mobile stations, such as wireless client 60. For example, in 802.11 wireless networks, the backbone radios on the wireless routing nodes may transmit wireless packets between each other using the 802.11a protocol on the 5 GHz band, while the second radio on each mesh access point may interact with wireless clients on the 2.4 GHz band (802.11b/g). Of course, this relation can also be reversed with backhaul traffic using the 802.11b/g frequency band, and client traffic using 802.11a band. In addition, the mesh access points may include only a single radio or additional radios.

In one implementation, some wireless mesh networks can include a controller and a plurality of mesh access points that are configured into one or more routing and control hierarchies based on automatic neighbor and route discovery protocols. In some environments, individual mesh access points automatically discover their neighbors and configure hierarchical routing configurations by selecting parent nodes based on a variety of factors. Mesh access points, in some systems, connect to a wireless controller through one or more parents nodes in the routing hierarchy.

B.2. Central Controller

FIG. 2A illustrates the logical relationship between mesh access points and controller 20 relative to wireless clients, according to one possible implementation of the invention. In one implementation, the mesh access points, in connecting with the controller 20, implement a hierarchical processing scheme for management of wireless connections with clients 60. For example, each mesh access point may be configured to autonomously implement time-critical link layer functions (such as transmitting acknowledgements), while encapsulating and forwarding wireless management frames (e.g., association requests, etc.) and other client traffic to controller 20 for processing. The encapsulated frames may traverse one or more intermediate mesh access points in the mesh hierarchy as indicated by FIG. 2A.

In other implementations, the controller 20 may be implemented as a wireless domain server (WDS). If the controller 20 is implemented as a WDS, the client side access functionally implemented by the mesh access points may comprise autonomous or so-called "fat" wireless access points. Of course, a variety of other mesh routing and control schemes can be used in connection with the real-time transport protocol described herein.

Figure 2B:
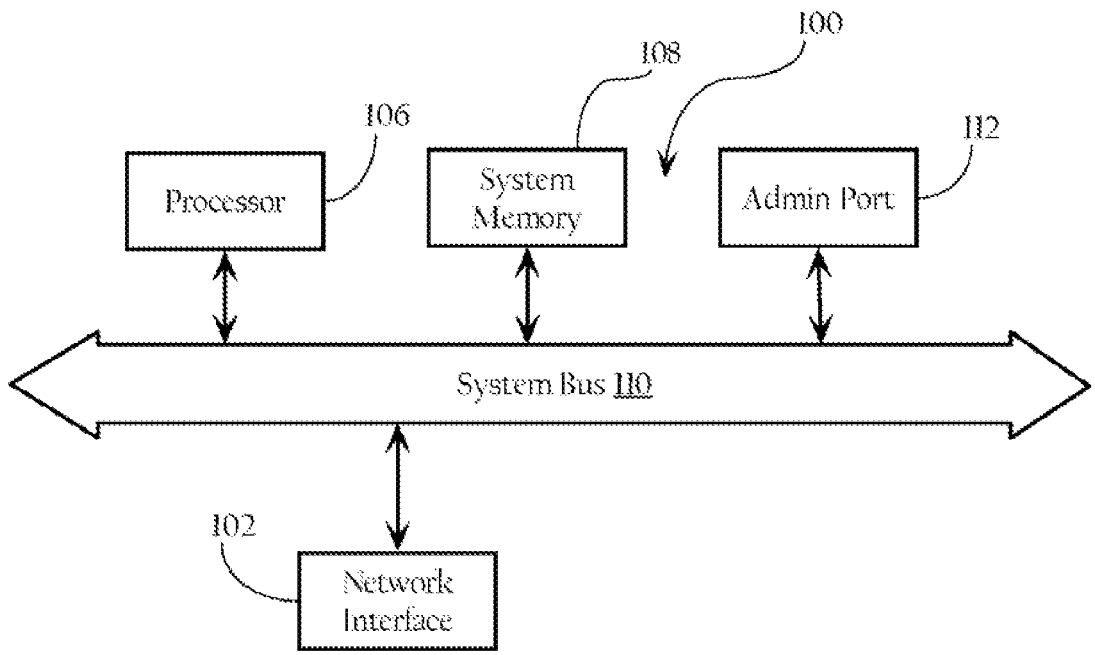
FIG. 2B illustrates an example hardware system, which may be used to implement a central controller.

FIG. 2B illustrates an example hardware system 100, which may be used to implement a controller 20. As FIG. 2B shows, in one implementation, the central controller 20 includes a network interface 102. Controller 20, in one implementation, further comprises a process 106, a memory 108, one or more software modules stored in memory 108, including instructions for performing the functions described herein, and a system bus 110 operably connecting these components. The central control elements may optionally include an administrative port 112 allowing for administrative access for such purposes as configurations and diagnostic access.

B.3. Wireless Mesh Access Point

FIG. 3A illustrates for didactic purposes a hardware system 300, which may be used to implement a wireless mesh access point in a wireless mesh network. In one implementation, the wireless mesh access point 300 comprises a processor 308, a read-only memory (ROM) 309, and an electronically erasable read-only memory (EEPROM) 311 including reserved memory space 311 for storing network management information including physical environment and parameter (PEP) information. PEP information may include, for example, antenna orientation, global positioning system (GPS) position, altitude, and height above the ground, etc. The wireless mesh access point 300 may also include one or more of the following: a memory 312, a network interface 314 (e.g., an 802.3 interface) for communication with a LAN, a cache 316 for storing WLAN information, and a persistant memory 318. The wireless mesh access point 300 may also include a backhaul wireless network interface 320 having an antenna 321. Backhaul wireless network interface 320 is configured to transmit and receive messages to/from one or more other wireless mesh access points in a mesh network. The wireless mesh access point 300 may also include a client wireless network interface 322 (e.g., an IEEE 802.11 WLAN interface) having an antenna 323. Client wireless network interfaces 322 is configured for wireless communication with one or more wireless clients 60. The wireless mesh access point 300 may also include and a system bus 322 interconnecting these components, input/output (I/O) ports 324, and an optional administration or control port (326).

In some implementations, wireless mesh access point use one or more of the following standards: WiFi/802.11, WiMax/802.16, 2G, 3G, or 4G Wireless, Bluetooth/802.15, Zigbee, or any other suitable wireless communication standards. In one implementation, wireless mesh access point may have a separate access radio, and associated interface components, for communicating with a wireless client or other portable computer. The wireless mesh access points may also include software modules, including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionally, etc., and device drivers (e.g., network and WLAN interface drivers) stored in persistent memory 318 (e.g., a hard disk drive, flash memory, EEPROM, etc.) At start up, these software components are loaded into system memory 312 and then accessed and executed by processor 310. In one implementation, the wireless access point includes software or firmware modules for recognizing the reception of network management information (e.g., PEP data) and for storing such information in memory (e.g., EEPROM 310).

FIG. 3B illustrates for didactic purposes a hardware system 325, which may be used to implement a wireless mesh access point in a wireless mesh network, in accordance with another implementation. In one implementation, the wireless mesh access point 325 may have similar components to that of wireless mesh access points 300 of FIG. 3A except that wireless mesh access point 325 of FIG. 3B includes wireless network interface 326 and antenna 328 instead of backhaul wireless network interface 320, antenna 321, client wireless network interface 322, and antenna 323. Furthermore, wireless mesh access point 325 also includes an 802.3 (Ethernet) interface 330.

C. Real-Time Data Transport Protocol

FIG. 4 illustrates an example flow diagram involving a real-time data transport protocol according to one particular implementation of the invention. While the implementation disclosed herein are described in the context of voice data, implementations may apply to other types of real-time session data in addition to voice, such as video, audio, and other streaming media traffic.

As FIG. 4 shows, a mesh access point includes a real-time transport protocol module 402 and a transport protocol module 404. In some implementations, other wireless network infrastructure nodes such as controller 20 may also include a voice transport module and transport protocol module. In implementations described herein, wireless mesh access points and controller 20 are each operative to perform the transmit and receive processes associated with the real-time data transport protocol described herein. In some implementations, the wireless mesh access points and the controller 20 each include a real-time data transport protocol module 402, which is operative to aggregate individual real-time session packets over a sliding window, and transmit the aggregated packets to a destination node (e.g., another mesh access point, central controller, etc.). In particular implementations, the transport protocol of a mesh access point is operative to add encapsulating headers to wireless client traffic and forward the encapsulated traffic to controller 20. In some particular implementations, the transport protocol module 404 may provide a datagram service. In other particular implementations, the transport protocol module 404 may also involve sequence numbers and re-ordering of received real-time data transport protocol (RDTP) packets. In one implementation, RDTP packets are not acknowledged by receiving nodes and no retries are attempted. In one implementation, the encapsulating headers include sequences facilitating packet re-ordering at the receive end. Likewise, the transport protocol of controller 20 is operative to encapsulate wireless client traffic and forward it to the appropriate wireless mesh access point for delivery to a wireless client. In one implementation, the transport protocol modules, as discussed above, are also operative to receive packets and re-order them based on sequence numbers associated with the packets.

As described in more detail below in connection with FIG. 5, a real-time data transport protocol module 402 of a mesh access point or controller 20 implements a RDTP, on a session-by-session basis. For didactic purposes, an implementation of the invention is described as operating on voice sessions. In Voice-over-Internet-Protocol (VoIP) sessions, a VoIP client typically includes a codec that outputs, at regular intervals, voice packets containing sampled voice data. In particular implementations, the real-time data transport protocol module 402 is operative to receive individual voice packets (e.g., voice packet 1, voice packet 2, voice packet 3, etc.) of a given voice session into an input queue 406, and aggregate N voice packets into a real-time data transport protocol (RDTP) packet (e.g. packet 1-2-3). Optionally, the real-time data transport protocol module 402 may compute a forward error correction (FEC) code based on the voice packets and include it in each RDTP packet. The real-time data transport protocol module 402 may then pass the RDTP packet to transport protocol module 404 to encapsulate and forward the RDTP packets (e.g., RDTP packet 1-2-3, RDTP packet 2-3-4, RDTP packet 4-5-6) to recipient node. As described in more detail below, in one implementation, the transport protocol module 404 may assign a sequence number to each RDTP packet. In one implementation, when the mesh access point receives RDTP packets (e.g., RDTP packet 11-12-13, RDTP packet 12-13-14, etc.), the mesh access point may implement the transport protocol to decapsulate the RDTP packets and re-order the received RDTP packets if needed.

C.1. Real-Time Data Transport Protocol

As described in more detail below in connection with FIG. 5, a real-time data transport protocol module 402 generates RDTP packets from individual voice packets, and then transmits the packets to a destination node.

Figure 5:
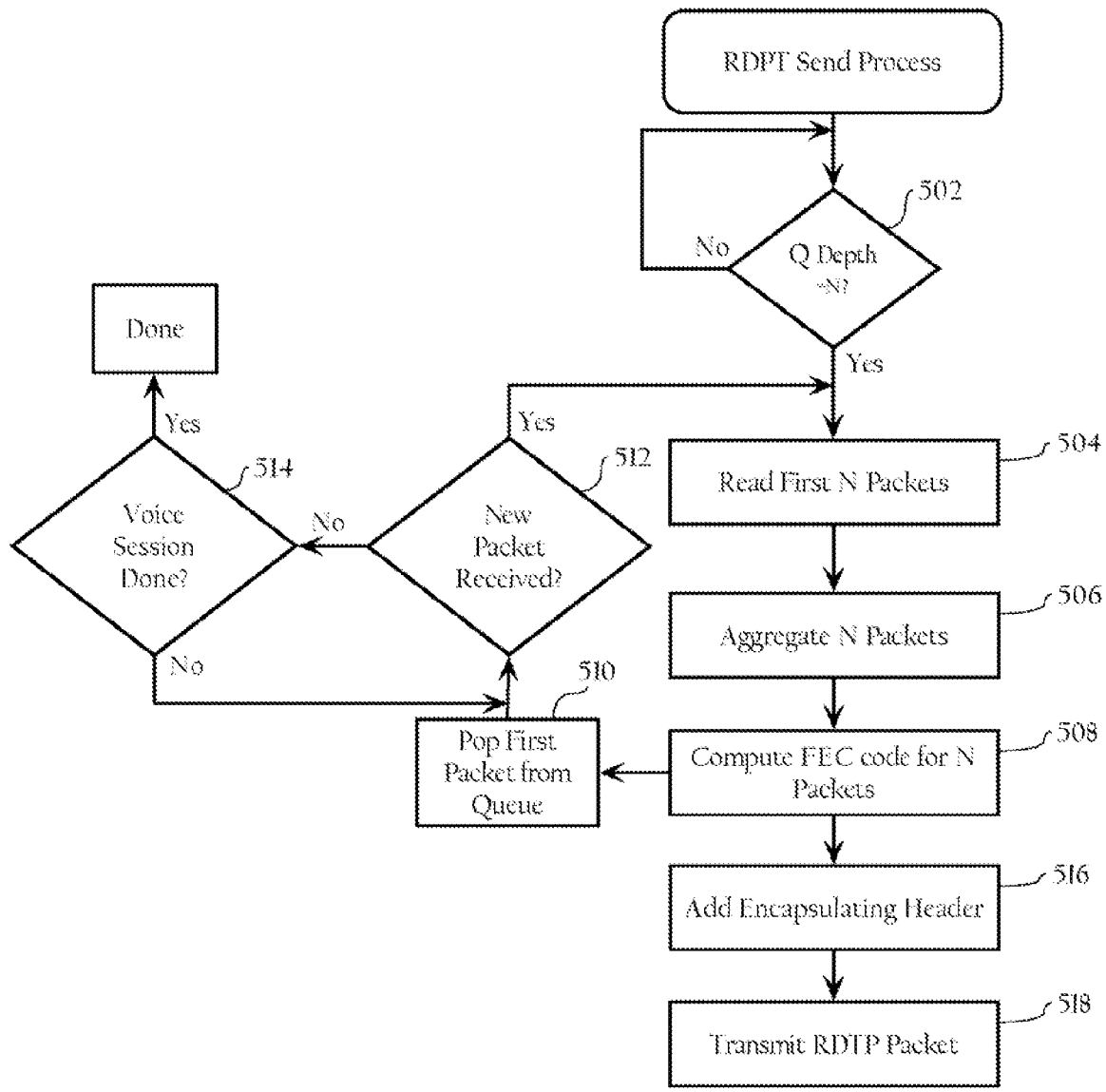
FIG. 5 illustrates an example method associated with a voice transport protocol.

FIG. 5 illustrates an example method associated with a voice transport protocol. As the mesh access point receives individual voice packets of an individual session into an input queue 404, the real-time data transport protocol module 402 monitors whether a predetermined queue depth has been reached (502). In one implementation, the queue depth may be a depth of N voice packets (e.g., 2 packets, 3 packets, 4 packets, etc.). The specific value for N will depend on the specific implementation. For example, in one implementation, N may change dynamically and may increase if the number of hops to the destination node increases or if the packet loss rate is high. The real-time data transport protocol module 402 then reads the first N voice packets from the input queue (504). For example, the first N packets may include a voice packet 1, a voice packet 2, and a voice packet 3. The real-time data transport protocol module 402 then aggregates the N voice packets into a RDTP packet (e.g., RDTP packet 2-3-4) (506).

In one implementation, the real-time data transport protocol module 402 does not wait for a predetermined queue depth to be reached before reading and aggregating voice packets. For example, the real-time data transport protocol module 402 may read a first voice packet received VP1 in the input queue as soon as possible and then include the voice packet in an RDTP packet. For example, upon reception of a second voice packet VP2, the RDTP transport protocol module 402 may send VP1 as well as VP2 within RDTP2. Similarly upon reception of VP3, the RDTP transport protocol may send VP1, VP2, and VP3 in RDTP3. RTDP4 may include VP2, VP3, and VP4 (in this example the sliding window size is "3"). As such, no jitter is introduced and each RTDP packet provides redundancy for the data which has been sent in the N (sliding window size) previous RDTP packets. In such an implementation, voice packets are not removed from the queue until a threshold queue depth (generally equal to the maximum number of native real-time session packet in an RDTP packet) has been reached.

The real-time data transport protocol module 402 then performs voice transport FEC on the N voice packet (508). That is, in one implementation, the real-time data transport protocol module 402 computes an FEC code based on the N packets. In one implementation, FEC may determine which bits, if any, have errors and proceed to correct such errors. In one implementation, FEC may compute bit errors and may or may not fix any errors. In one implementation, the mesh access point may utilize any suitable error correction scheme such as Reed Solomon error correction. Read Solomon error correction is an error-correcting code that involves over-sampling a polynomial constructed from the data. In mesh networks, packets size does not affect the performance in terms of packets per seconds. This is the case even in large area networks where the distances between mesh access points may be long. Any time delays due to collision avoidance may represent about a half of the average radio time, and more than half for small packets such as voice packets. Accordingly, carrying extra bytes for proactive FEC comes at minimal cost in terms of throughput.

The real-time data transport protocol module 402 them removes, or "pops," the first packet (e.g., packet 1) from the front of the input queue 404 (510). The real-time data transport protocol module 402 then determines if it has received a new voice packet (e.g., voice packets 4) into the input queue (512). If the mesh access point has received a new voice packet into the input queue, the real-time data transport protocol module 402 again reads the first N voice packets (e.g., packets 2, 3, 4) from the input queue (504), aggregates those packets (e.g., RDTP packet 2-3-4) (506), and computes an FEC code based on the voice packets (508). If the mesh access point has not received a new voice packet into the input queue, the real-time data transport protocol module 402 determines if the voice session is complete (514) and the process ends. In one implementation, the voice session may be determined to be complete if, for example, no more packets having the same voice session ID where received within a certain time period. If the voice session is not complete, the real-time data transport protocol module 402 continues to determine if it has received a new voice packet into the input queue (512).

After the mesh access point performs voice transport FEC on a given set of RDTP packets (RDTP packet 1-2-3, RDTP packet 2-3-4, etc.), the real-time data transport protocol module 402 passes the N packets and FEC to the transport protocol module 404, which encapsulates each RDTP packet (e.g., into an 802.11 LWAPP packet) (516), and then transmits each encapsulated RDTP packet to a destination node (mesh access point or controller 20, depending on the direction) (518).

In one implementation, the real-time data transport protocol module 402 may identify each voice session with a voice session ID. Within a given voice session, in one implementation, the real-time data transport protocol module 402 may assign a sequence number to each RDTP packet. For example, RDTP packet 1-2-3 may be assigned sequence number 1, RDTP packet 2-3-4 may be assigned sequence number 2, etc. In one implementation, after a given RDTP packet is assigned a sequence number, the real-time data transport protocol module 402 may increment a sequence counter. Such sequencing enables the transport protocol, on the receiving end, to identify gaps and to reorder RDTP packets if needed. In one implementation, the real-time data transport protocol module 402 may set a voice flag in a given RDTP packet to indicate that the packet is a voice transport protocol packet.

On route to a destination, the RDTP packet typically passes through one or more intermediate mesh access points. Each intermediate mesh access point, in one particular implementation, executes an intermediate transport protocol in order to determine whether to pass along a given RDTP packet. As described in more detail below in connection with FIG. 6, the intermediate mesh access point passes along RDTP packets without errors but will also pass along some RDTP packets (e.g., voice packets) even with errors.

C.2. Processing by Intermediate Nodes

Figure 6:
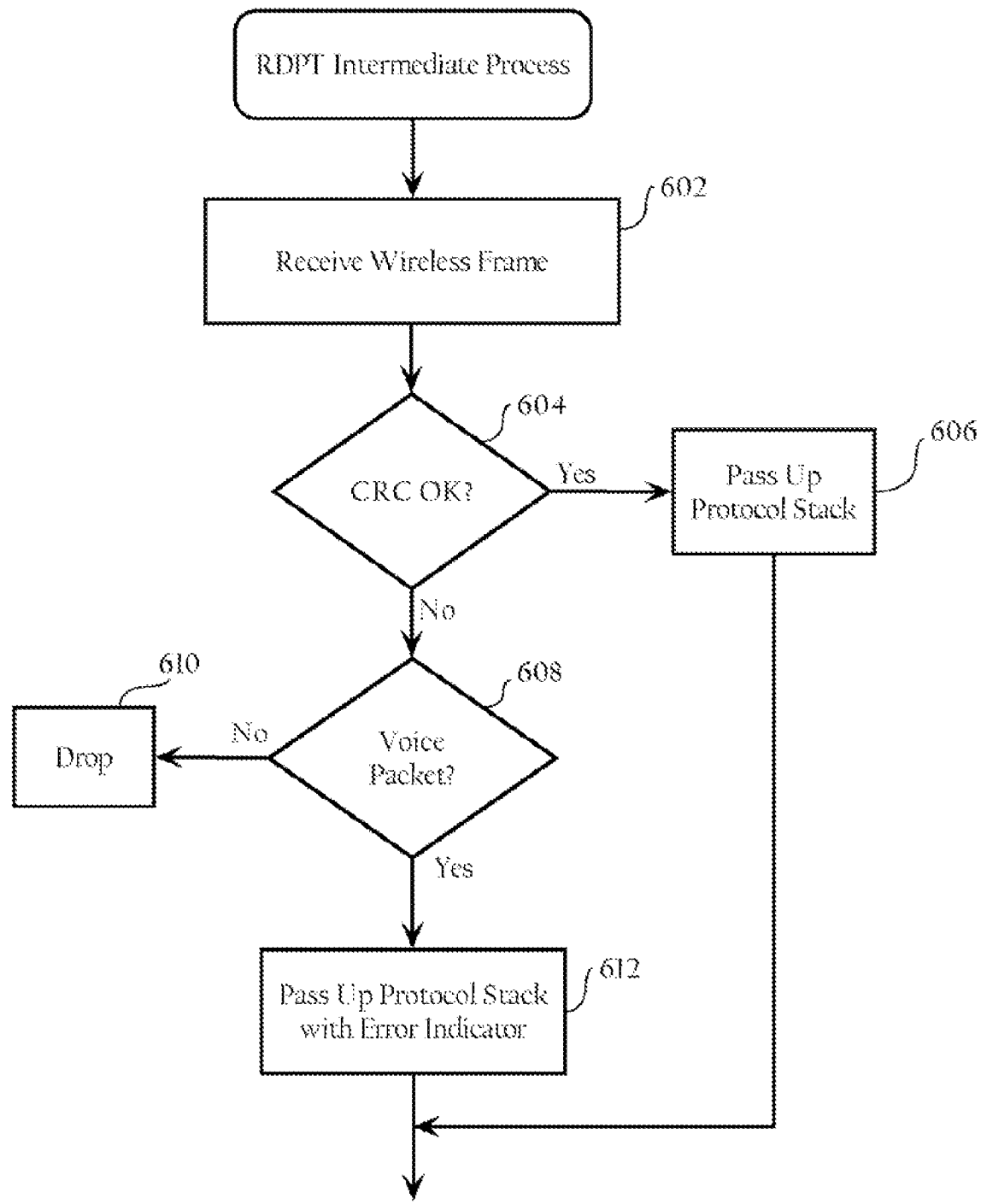
FIG. 6 illustrates an example method associated with an intermediate transport protocol.

FIG. 6 illustrates an example method associated with an intermediate transport protocol. In one implementation, when the intermediate mesh access point receives a RDTP packet (e.g., 802.11/LWAPP frame) (602), the intermediate mesh access point may place the RDTP packet in high priority queue for prioritized access to the wireless mesh backbone bandwidth. The intermediate mesh access point then determines if the physical/link layer cyclic redundancy code (CRC) is correct (604). If correct, the intermediate mesh access point passes the RDTP packet up the protocol stack for processing (608). If the physical/link layer CRC code is not correct, the intermediate mesh access point determines if the RDTP packet is a voice transport protocol packet (608). If the RDTP packet is not a voice transport protocol packet, the intermediate mesh access point drops the RDTP packet (610). If the RDTP packet is a voice transport protocol packet, the intermediate mesh access point passes the packet up the protocol stack with the error (612). In one implementation, the intermediate mesh access point transmits the packet with an error flag.

C.3. Processing of Received RDTP Packets

As described in more detail below in connection with FIGS. 7 and 8, the transport protocol module 404 at a receiving node implements a transport protocol to receive RDTP packets and, optionally, perform FEC on each of the RDTP packets. For most types of packets (e.g., non-voice packets), the real-time data transport protocol module 402 passes packets without errors up the protocol stack and drops packets with errors. For other types of packets (e.g., real-time data transport protocol packets), the real-time data transport protocol module 402 passes voice packets to higher levels of the protocol stack even with errors. This ensures that real-time data transport protocol packets are reliably transmitted from sender to receiver.

Figure 7:
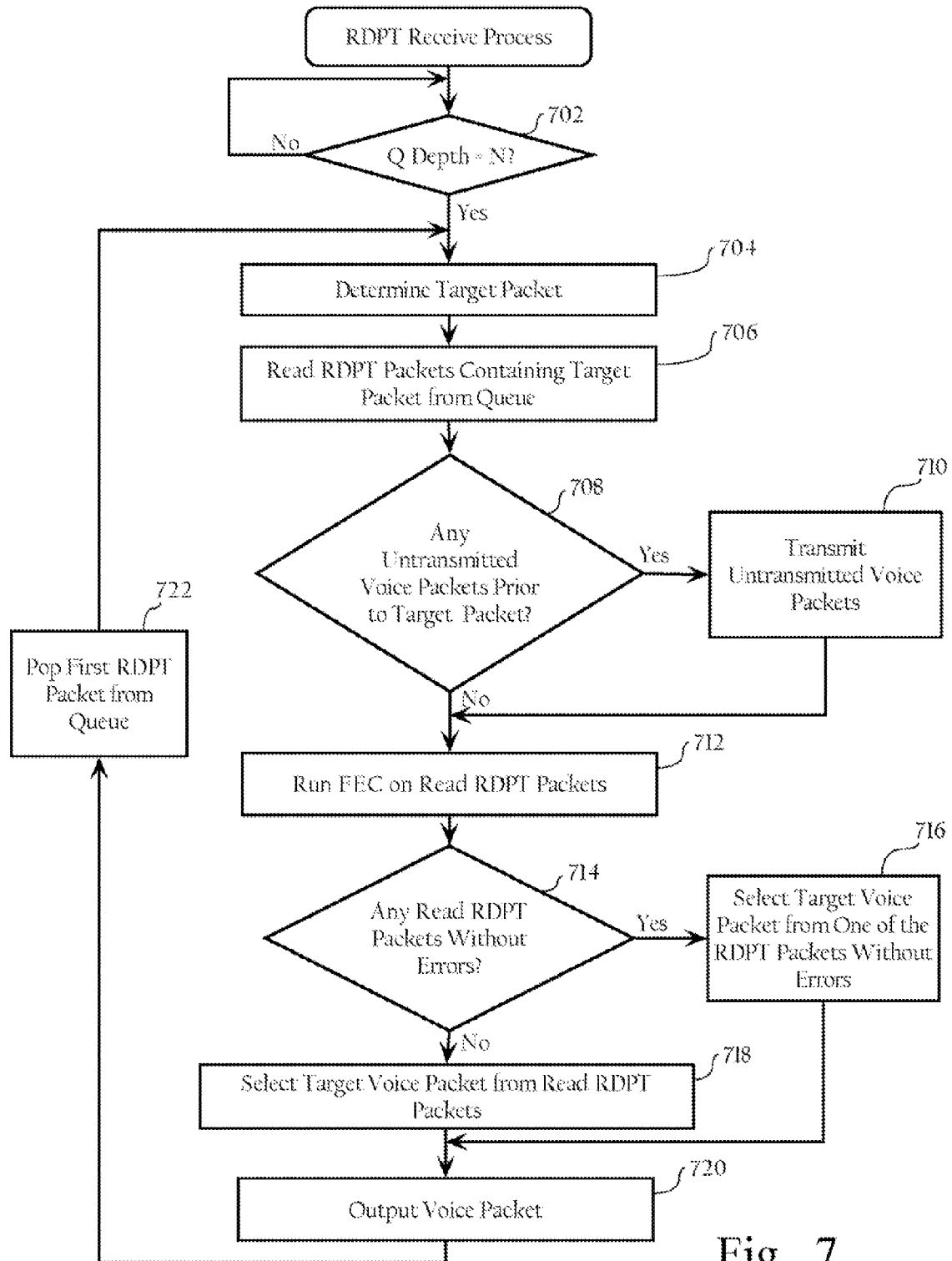
FIG. 7 illustrates an example method associated with a transport protocol.

FIG. 7 illustrates an example method associated with a real-time data transport protocol. FIG. 8 shows a receive queue 802 containing received RDTP packets (e.g., RDTP packet 1-2-3-, RDTP packet 2-3-4, RDTP packet 3-4-5, etc.). As discussed herein, transport module is operative to re-order received RDTP packets based on sequence numbers and insert them in appropriate locations in the queue or other buffer structure. As a mesh access point receives RDTP packets into receive queue 802, the real-time data transport protocol module 402 monitors whether a predetermined queue depth (e.g., N packets) has been reached (702). In one implementation, the queue depth may be a depth of N RDTP packets (e.g., 3 RDTP packets). The real-time data transport protocol module 402 then determines a target voice packet (e.g., voice packet 3) (704). The real-time data transport protocol module 402 then reads from the receive queue 802 the first N RDTP packets that include the target voice packet (706). For example, if the target voice packet is packet 3, the real-time data transport protocol module 402 may read RDTP packet 1-2-3, then RDTP packet 2-3-4, and then RDTP packet 3-4-5. This scenario assumes that no RDTP packet 3-4-5 has been dropped. In another example, if the target voice packet is voice packet 5 and RDTP packet 5-6-7 has been dropped, the transport protocol module 404 would read RDTP packet 3-4-5 and RDTP packet 4-5-6.

Referring again to FIG. 7, the real-time data transport protocol module 402 then determines if the read RDTP packets include any untransmitted voice packets prior to the target voice packet (708). For example, in the scenario above where the target voice packet is voice packet 3, untransmitted voice packets prior to target voice packet 3 may include voice packet 1 and voice packet 2. As such, the real-time data transport protocol module 402 would transmit these untransmitted voice packets (710).

If there are no untransmitted voices packets, the real-time data transport protocol module 402 then performs voice transport FEC on the read RDTP packets (712) and then determines if any of the read RDTP packets do not have any FEC errors (714). If there are any RDTP packets without FEC errors, the real-time data transport protocol module 402 selects a target voice packet from one of the RDTP without errors (716). In one implementation, the real-time data transport protocol module 402 may select the last RDTP packet without errors. For example, if RDTP packets 1-2-3 and 2-3-4 were read and both of the RDTP packets have no errors, the real-time data transport protocol module 402 may select RDTP pactket 2-3-4. If there are no read RDTP packets without errors (e.g., all have errors), the real-time data transport protocol module 402 selects a target voice from one of the RDTP packets (718). In one implementation, the selected RDTP packet may be the one with the fewest errors. In another implementation, the selected RDTP packet may be the last RDTP packet read, any arbitrary RDTP packet, etc. The real-time data transport protocol module 402 then outputs the target voice packet (720) and removes the first RDTP packet from the receive queue (722).

Other implementations are possible. For example, in one implementation, the real-time data transport protocol module 402 may not wait for a predetermined queue depth to be reached before identifying and reading a target voice packet. For example, if the first received RDTP packet includes a voice packet 1, the real-time data transport protocol module 402 may extract and forward that the voice packet without waiting for redundant copies. This may have the benefit of avoiding jitter. If the next received RDTP packet includes voice packet 1 and voice packet 2, the real-time data transport protocol module 402 may then extract and forward voice packet 2. Still further, in other implementations, the transport protocol module 404 may not re-order packets. In such an implementation, the real-time data transport module 402 simply extracts the first occurrence of each packet of the real-time protocol session from the RDTP packets, and drops subsequently received copies of previously extracted native session packets. For example, assume for didactic purposes the following sequence of receiving RDTP packets: RDTP(P1), RDTP(P1, P2), RDTP(P2, P3, P4), and RDTP(P1, P2, P3). In response to this sequence, real-time data transport protocol module 402 would extract and forward P1 upon receipt of RDTP (P1), and extract and forward P2 upon receipt of RDTP (P1, P2). Realtime data transport protocol module 402 would extract and forward P3 and P4 upon receipt of RDTP(P2, P3, P4), and simply drop RDTP(P1,P2,P3) because all native packets have already been forwarded.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. An apparatus, comprising:
a processor;
a wireless network interface;
a memory; and
one or more code modules stored in a persistent memory, the one or more code modules comprising computer-readable instructions operable, when executed, to cause the processor to:
access a plurality of packets of a real-time protocol session;
aggregate, over a sliding window, a contiguous sequence of N packets in the plurality of packets into real-time data transport packets by:
storing, in a buffer, the plurality of packets of the real-time protocol session;
packing the first N packets of the real-time protocol session stored in the buffer into a real-time data transport protocol packet;
removing the first packet of the real-time protocol session from the buffer; and
repeating the pack and remove steps while the buffer contains packets of the real-time protocol session; and
transmit the real-time data transport packets to a receiving node;
wherein N is a dynamically determined number greater than or equal to 2 and based on a number of hops to the receiving node.

2. The apparatus of claim 1 wherein the one or more code modules further comprises computer-readable instructions operable, when executed, to cause the processor to: perform forward error correction (FEC) on the real time protocol packets.

3. A method comprising:
accessing a memory buffering a plurality of packets of a real-time protocol session;
aggregating, over a sliding window, a contiguous sequence of N packets in the plurality of packets into real-time data transport packet by:
storing, in a buffer, the plurality of packets of the real-time protocol session;
packing the first N packets of the real-time protocol session stored in the buffer into a real-time data transport protocol packet;
removing the first packet of the real-time protocol session from the buffer; and
repeating the packing and removing steps while the buffer contains packets of the real-time protocol session; and
transmitting the real-time data transport packets to a receiving node;
wherein N is a dynamically determined number greater than or equal to 2 and based on a number of hops to the receiving node.

4. The method of claim 3 further comprising performing forward error correction (FEC) on the real time protocol packets.

5. A system comprising:
a wireless network infrastructure node operable to access a plurality of packets of a real-time protocol session;
aggregate, over a sliding window, a contiguous sequence of N packets in the plurality of packets into real-time data transport packets by:
storing, in a buffer, the plurality of packets of the real-time protocol session;
packing the first N packets of the real-time protocol session stored in the buffer into a real-time data transport protocol packet;
removing the first packet of the real-time protocol session from the buffer; and repeating the packing and removing steps while the buffer contains packets of the real-time protocol session;
wherein N is a dynamically determined number greater than or equal to 2 and based on a number of hops to the receiving node; and transmit the real-time data transport packets to a wireless client; and the wireless client operable to communicate with the wireless network infrastructure node.

6. The system of claim 5 wherein the wireless network infrastructure node is further operable to perform forward error correction (FEC) on the real time protocol packets.

7. An apparatus, comprising:
a processor;
a wireless network interface;
a memory; and
one or more code modules stored in a persistent memory, the one or more code modules comprising computer-readable instructions operable, when executed, to cause the processor to:
access a plurality of real-time data transport (RDTP) packets, wherein each RDTP packet comprises a contiguous sequence of N packets of a real-time protocol session, wherein at least one packet in the contiguous sequence of N packets of each RDTP packet is a copy of a corresponding packet of a prior RDTP packet, and wherein N is a dynamically determined number greater than or equal to 2 and based on a number of hops to a receiving node;
determine a target packet for the real-time protocol session;
identify the RDTP packets of the plurality of RDTP packets that include the target packet; and
select a copy of the target packet from one of the identified RDTP packets for output.

8. The apparatus of claim 7 wherein, to select the copy of the target packet from one of the identified RDTP packets, the one or more code modules further comprises computer-readable instructions operable, when executed, to cause the processor to:
determine if there are any identified RDTP packets without any errors;
if there are any identified RDTP packets without any errors, select the copy of the target packet from the last identified RDTP packet without any errors; and
if there are no identified RDTP packets without any errors, select the copy of the target packet from any one of the identified RDTP packets.

9. The apparatus of claim 7 wherein the one or more code modules further comprises computer-readable instructions operable, when executed, to cause the processor to:
access the plurality of RDTP transport protocol packets from a queue; and
after the copy of the target packet is selected, remove the first RDTP transport protocol packet from the queue.

10. The apparatus of claim 7 wherein the logic is further operable to:
determine if there are any untransmitted packets of the real-time protocol session prior to the target packet; and
if there are any untransmitted packets prior to the target packet, transmit the packets prior to the target packet.

11. A method comprising:
accessing a memory buffering a plurality of real-time data transport (RDTP) packets, wherein each RDTP packet comprises a contiguous sequence of N packets of a real-time protocol session wherein at least one packet in the contiguous sequence of N packets of each RDTP packet is a copy of a corresponding packet of a prior RDTP packet, and wherein N is a dynamically determined number greater than or equal to 2 and based on a number of hops to a receiving node;
determining a target packet for the real-time protocol session;
identifying the RDTP packets of the plurality of RDTP packets that include the target packet; and
selecting a copy of the target packet from one of the identified RDTP packets for output.

12. The method of claim 11 further comprising:
determining if there are any identified RDTP packets without any errors;
if there are any identified RDTP packets without any errors, selecting the copy of the target packet from the last identified RDTP packet without any errors; and
if there are no identified RDTP packets without any errors, selecting the copy of the target packet from any one of the identified RDTP packets.

13. The method of claim 11 further comprising:
accessing the plurality of RDTP transport protocol packets from a queue; and
after the copy of the target packet is selected, removing the first RDTP transport protocol packet from the queue.

14. The method of claim 11 further comprising:
determining if there are any untransmitted packets of the real-time protocol session prior to the target packet; and
if there are any untransmitted packets prior to the target packet, transmitting the packets prior to the target packet.

15. A system comprising:
a wireless network infrastructure node operable to access a plurality of real-time data transport (RDTP) packets, wherein each RDTP packet comprises a contiguous sequence of N packets of a real-time protocol session, wherein at least one packet in the contiguous sequence of N packets of each RDTP packet is a copy of a corresponding packet of a prior RDTP packet, and wherein N is a dynamically determined number greater than or equal to 2 and based on a number of hops to a receiving node; determine a target packet for the real-time protocol session; identify the RDTP packets of the plurality of RDTP packets that include the target packet; and select a copy of the target packet from one of the identified RDTP packets for output; and
a wireless client operable to communicate with the wireless network infrastructure node.

16. The system of claim 15 wherein, to select the copy of the target packet from one of the identified RDTP packets, the wireless network infrastructure node is further operable to:
determine if there are any identified RDTP packets without any errors;
if there are any identified RDTP packets without any errors, select the copy of the target packet from the last identified RDTP packet without any errors; and
if there are no identified RDTP packets without any errors, select the copy of the target packet from any one of the identified RDTP packets.

17. The system of claim 15 wherein the wireless network infrastructure node is further operable to:
access the plurality of RDTP transport protocol packets from a queue; and
after the copy of the target packet is selected, remove the first RDTP transport protocol packet from the queue.

18. The system of claim 15 wherein the wireless network infrastructure node is further operable to:
determine if there are any untransmitted packets of the real-time protocol session prior to the target packet; and
if there are any untransmitted packets prior to the target packet, transmit the packets prior to the target packet.

* * * * *